United States Patent [19]
Koh

[11] Patent Number: 5,761,350
[45] Date of Patent: Jun. 2, 1998

[54] METHOD AND APPARATUS FOR PROVIDING A SEAMLESS ELECTRICAL/ OPTICAL MULTI-LAYER MICRO-OPTO-ELECTRO-MECHANICAL SYSTEM ASSEMBLY

[76] Inventor: Seungug Koh, 3122 Mill Pond Dr., Bellbrook, Ohio 45305

[21] Appl. No.: 787,119

[22] Filed: Jan. 22, 1997

[51] Int. Cl.[6] ........................................... G02B 6/12
[52] U.S. Cl. ...................................................... 385/14
[58] Field of Search ................................ 385/2, 11, 12, 385/14, 16, 37, 50, 129; 359/115, 127; 257/14, 85, 96, 431, 615

[56] References Cited

U.S. PATENT DOCUMENTS

| | | | |
|---|---|---|---|
| 4,669,815 | 6/1987 | Thaniyavarn | 385/11 |
| 4,682,323 | 7/1987 | Corfield et al. | 370/4 |
| 4,696,536 | 9/1987 | Albares et al. | 385/14 |
| 4,697,868 | 10/1987 | Thanivavarn | 385/11 |
| 4,871,224 | 10/1989 | Karstensen et al. | 385/88 |
| 5,157,461 | 10/1992 | Page | 356/350 |
| 5,255,111 | 10/1993 | Kwa | 359/113 |
| 5,263,111 | 11/1993 | Nurse et al. | 385/130 |
| 5,267,336 | 11/1993 | Sriram et al. | 385/2 |
| 5,271,074 | 12/1993 | Tocci | 385/16 |
| 5,276,745 | 1/1994 | Revelli, Jr. | 385/14 |
| 5,416,861 | 5/1995 | Koh et al. | 385/14 |

FOREIGN PATENT DOCUMENTS

| | | |
|---|---|---|
| 322218 | 6/1989 | European Pat. Off. . |
| 3218193 | 2/1984 | Germany . |

OTHER PUBLICATIONS

Ahmed El–Amawy, "Clocking Abritrarily Large Computing Structures Under Constant Skew Bound," *IEEE Transactions on Parallel and Distributed systems*, vol. 4, No. 3, pp. 241–255, Mar. 1993.

Gail R. Lalk et al., "Board Level High Speed Photonic Interconnections: Recent System Developments," *Optical Interconnects in the Computer environment*, SPIE vol. 1178, pp. 123–130, 1989.

Davis H. Hartman, "Digital High Speed Interconnects: A Study of the Optical Alternative," *Optical Engineering*, vol. 25, No. 10, pp. 1086–1102, Oct., 1986.

Allan L. Fisher et al., "Synchronizing Large VLSI Processor Arrays," *IEEE Transactions on Computers*, vol. C–34, No.8, pp. 734–740, Aug., 1985.

Morteza Afghahi et al., "Performance of Synchronous and Asynchronous Schemes for VLSI Systems," *IEEE Transactions on computers*, vol. 41, No. 7, pp. 858–872, Jul., 1992.

(List continued on next page.)

*Primary Examiner*—Akm E. Ullah
*Attorney, Agent, or Firm*—Frost & Jacobs

[57] ABSTRACT

Optoelectronic interconnections can provide a practical solution for the ever increasing communication bottleneck problems when combining a multitude of information processing units to perform a function. As research activities progress in the field of serial or parallel board-to-board and module-to-module interconnections, some of the research focus has shifted to smaller physical dimensions, like intra-module interconnections, which combines optoelectronic interconnections, multichip module packaging, and micro-electromechanical system (MEMS) technologies at the module level. The present invention provides integrated optical input/output (I/O) couplers on multichip modules (MCMs) using micro-machined silicon mirrors that are used with optoelectronic multichip modules (OE-MCMs). The present invention used microstructures that integrate optical waveguide networks, multilayer electrical transmission line networks, micro-machined silicon mirrors, and C4-bonded photonic devices into a single structure. Using both sides of the silicon wafers, multiple metal layers and optical waveguide layers are fabricated for all types of metal or optical waveguide materials. The input/output coupling arrangement utilizes a combination of micro-machined silicon mirrors and through-holes across OE-MCM, integrated together into a single package. Fabrication strategies and possible applications of the invention are disclosed herein.

17 Claims, 7 Drawing Sheets

OTHER PUBLICATIONS

Andrew Kahng et al., "High Performance Clock Routing Based on Recursive Geometric Matching," *28th ACM/IEEE Design Automation Conference®*, UCLA Department of Computer Science, Los Angeles, California, pp. 322–327.

Toshikazu Sakano et al., "Multiprocessor System using an Automatically Rearrangeable Free–Space Multichannel Optical Switch: COSINE–2," *Applied Optics*, vol. 32, No. 20, pp. 3690–3699, Jul. 10, 1993.

Paola Cinato et al., "Optical Interconnections Within Multichip Modules," *Optical Engineering*, vol. 32, No. 4, pp. 852–860, Apr., 1993.

T. Tamir et al., "analysis and Design of Grating Couplers," *Applied Physics*, Appl. Phys. 14.235–254 (1977), pp. 235–254.

J. W. Parker, "Esprit II Olives—A European Collaborative Porgrammed in Optical Interconnections," 1990 STC PLC, pp. 408–413.

Ren–Song Tsay, "An Exact Zero–Skew Clock Routing Algorithm," *IEEE Transactions on Computer–Aided Design on Integrated Circuits and Systems*, vol. 12, No. 2, pp. 242–249, Feb. 1993.

Victor Mizrahi et al., "Ultraviolet Laser Fabrication of Ultrastrong Optical Fiber Gratings and of Germania–Doped Channel Waveguides," *Appl. Phys. Lett.* vol. 63, No. 13, pp. 1727–1729, Sep. 27, 1993.

Meiliu Lu et al., "Analysis of Self–stabilizing Clock Synchronization by Means of Stochastic Petri Nets," *IEEE Transactions on Computers*, vol. 39, No. 5, pp. 597–604, May, 1990.

Chung–Sheng Li et al., "Fully Differential Optical Interconnections for High–Speed Digital Systems," *IEEE Trnsactions on Very Large integration (VLSD Systems)*, vol. 1, No. 2, pp. 151–163, Jun., 1993.

K.W. Jelley et al., "High–Speed Chip–to–Chip Optical Interconnect," *IEEE Photonics Technology Letters*, vol. 4, No. 10, pp. 1157–1159, Oct., 1992.

S.K. Tewksbury et al., "Opportunities and Issues for Optical Interconnects in Microelectronic Systems," *Opteoelectronics: Technologies and Applications*, Chapter 11, pp. 232–263, SPIE.

Pradeep Lall et al., "An overview of Multichip Modules," *Solid State Technology*, pp. 65–76, Sep., 1993.

K.H. Calhoun et al., Vertical Optical Communication Through Stacked Silicon Wafers Using Hybrid Monolithic thin Film InGaAsP Emitters and Detectors, *IEEE Photonics Technology Letters*, vol. 5, No. 2, pp. 254–257, Feb., 1993.

Chung–Sheng Li et al., "Differential Board/Backplane Optical Interconnects for High–Speed Digital Systems, Part I: Theory," *Journal of Lightwave Technology*, vol. 11, No. 7, pp. 1234–1249, Jul., 1993.

J.W. Goodman et al, "Optical Interconnections for VLSI Systems," *Proceedings of the IEEE*, vol. 72, No. 7, pp. 850–866, Jul., 1984.

S.J. Walker et al, "Optical Clock Distribution Using Integrated Free–Space Optics," *Optics Communications*, vol. 90, No. 4/5, pp. 359–371, Jun. 15, 1992.

D.H. Hartman, "Optical Interconnects at the Multi–Chip Modeule Level; A View From the System Level," *Proceedings 43 RD Electronic Components & Technology Conference*, pp. 701–704, Jun. 1, 1993.

H.D. Hendricks et al, "Optical Backplane Interconnect for Data Processors," *IEEE Proceedings Energy and Information Technologies in the Southeast*, vol. 3, pp. 1132–1138, Apr. 9, 1989.

I. Hayashi, "Photo–Electronic Integrated Systems: The Basic Concept of U–OEICs and Their Feasibility," *Optoelectronics Devices and Technologies*, vol. 9, No. 1, pp. 1–13, Mar. 1994.

Y. Yamada et al, "Optical Interconnections Using a Silica–Based Waveguide on a Silicon Substrate," *Optical Engineering*, vol. 28, No. 12, pp. 1201–1207, Dec., 1989.

K. Kaspet et al, "Rapid Deposition of High–Quality Silicon–Oxinitride Waveguides," *IEEE Photonics Technology Letters*, vol. 3, No. 12, pp. 1096–1098, Dec., 1991.

S. Koh et al, "Synchronous Global Clock Distribution on Multichip Moldules Using Optical Waveguides," *Optical Engineering*, vol. 33, No. 5, pp. 1587–1595, May, 1994.

Carola Strandman et al, "Fabrication of 45° Optical Mirrors on (100)Si Using Wet Anisotropic Etching," pp. 244–249. It is applicant's current understanding that this paper was publicly available prior to Jan. 25, 1995.

Akio Yoshikawa et al, "Laser –Detector–Hologram Unit for Thin Optical Pick–up Head of a CD Player," *IEEE Transactions on Components, Packaging and Manufacturing Technology*, Part B, vol. 18, No. 2, pp. 245–249, May 2, 1995. This paper was presented publicly on May 1–4, 1994. It is applicant's current understanding that the paper itself was publicly available prior to Jan. 25, 1995.

T.A. Kwa et al, "Fabrication of Extremely Smooth Mirror Surfaces in Silicon for Application in an Integrated Spectrometer," pp. 242–245, 1993.

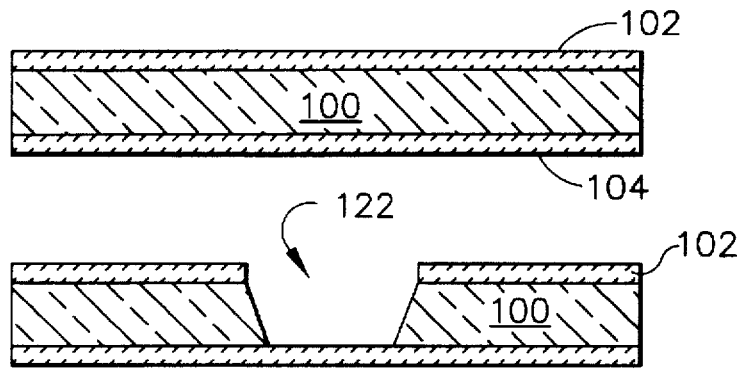
FIG. 4A
FIG. 4B
FIG. 4C
FIG. 4D
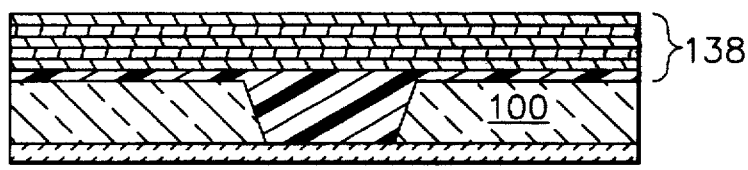
FIG. 4E
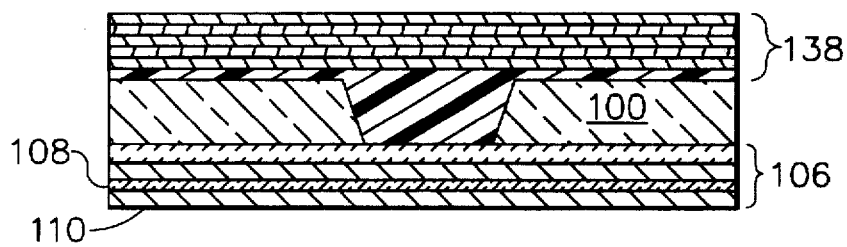
FIG. 4F
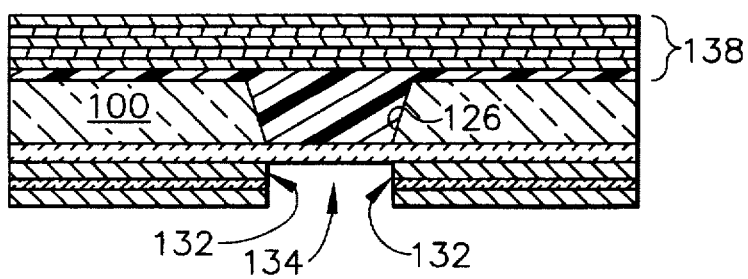
FIG. 4G ns among IC's on the MCMs. Most of today's MCMs are electronic MCMs which employ electrical signals (electrons) to process information and transmit signals. The majority of MCMs use high-speed IC's as basic building blocks and the interconnections among those IC's are implemented by use of multilayer metal transmission lines. Today's electronic modules (i.e. electronic information processing systems), aided by innovative integrated circuit design and fabrication technologies, are providing a good performance/cost ratio and it is expected this trend will continue for the time being.

METHOD AND APPARATUS FOR PROVIDING A SEAMLESS ELECTRICAL/ OPTICAL MULTI-LAYER MICRO-OPTO-ELECTRO-MECHANICAL SYSTEM ASSEMBLY

TECHNICAL FIELD

The present invention relates generally to integrated circuits that contain electrical and optical signals and is particularly directed to a multi-layer, multi-chip assembly of the type which provides seamless integration of electronic processing units, photonic/electronic interconnection networks, and micromachined I/O couplers for computer systems and communication networks. The invention is specifically disclosed as a MicroOptoElectroMechanical System that integrates high speed electronic processing units and high bandwidth photonic interconnection networks.

BACKGROUND OF THE INVENTION

Recently there has been an accelerated integration of computer systems and communication networks in an attempt to satisfy the ever-increasing information processing, transmission, and distribution demands needed by future computer systems and communication networks. High-performance microprocessors with large integration densities, diverse functionality, and high-speed operation capabilities are now routinely fabricated and utilized due to innovative design architectures and improved silicon fabrication processes. However, the increasing need for high-performance applications using computer and communication systems demands improvements in communication delay and connectivity.

Optoelectronic interconnect and multichip modules (MCMs) are recognized as possible technologies to relieve the above-related communication bottlenecks. It has been observed that if optoelectronic interconnect networks are integrated into a single MCM substrate, the resulting structure may solve many system level problems of computer systems and communication networks, such as distributing global clock signal; in addition, such structures can manage thermal energy removal at the module level by integrating microstructures such as micropumps or micromotors on a silicon substrate to create active air/liquid cooling system on MCMs. The integrated MCMs can solve some of the interface problems between electronic and optoelectronic components using tightly coupling high-speed information processing units (e.g., commonly-available microprocessors) and high-capacity information transmission mediums with low power consumption (e.g., integrated optical waveguide networks) at the module level.

MCM is a high-density integrated circuit (IC) packaging technology used to make high-speed information processing modules by reducing IC packaging levels and realizing miniaturization. The use of MCMs allows multiple IC's to be packaged into a single substrate and to provide shorter and higher-capacity interconnect networks among IC's on the MCMs. Most of today's MCMs are electronic MCMs which employ electrical signals (electrons) to process information and transmit signals. The majority of MCMs use high-speed IC's as basic building blocks and the interconnections among those IC's are implemented by use of multilayer metal transmission lines. Today's electronic modules (i.e. electronic information processing systems), aided by innovative integrated circuit design and fabrication technologies, are providing a good performance/cost ratio and it is expected this trend will continue for the time being.

On the other hand, fiber optic telecommunication systems enjoy great success by employing a different type of physical signals (optical signals based on photons) and transmission medium (optical fibers) to transfer information among various functional modules.

Optical telecommunication systems employing optical fibers as the transmission medium have exhibited a superior performance/cost ratio for long distance communications and also provide the potential of fulfilling the ever-increasing demands for future communication systems. It is widely believed that high-performance information processing systems of tomorrow may employ electronic systems for data processing purposes while photonic systems are utilized for data communication purposes, by taking advantages of the best features of both systems. Guided wave optoelectronic interconnect networks at module or board levels show promise for an efficient communications network capable of meeting future communications at a smaller physical scale. However the envisioned high-performance information processing systems of tomorrow have various integration problems of electronic and photonic components at both the device and system level.

Notably there is a need for a new device structure which can support a seamless photonic/electronic module integration without fabrication compatibility problems, and which can take advantage of hybrid photonic/electronic systems at a reasonable cost. This type of low level device integration problem needs to be addressed as early as possible, since system designers are mostly concerned with performance, cost, and reliability of the assembled system.

SUMMARY OF THE INVENTION

Accordingly, it is a primary object of the present invention to provide MicroOptoElectroMechanical Systems (MOEMS) composed of electronic processing units, photonic/electronic interconnection network, and micromachined I/O couplers on MCMs.

It is another object of the present invention to construct MOEMS which can provide innovative device structures that can integrate photonic/electronic components seamlessly at the micrometer scale by using integrated optical input/output(I/O) couplers on MCMs.

It is a further object of the present invention to provide a method for constructing MOEMS, relying on microelectromechanical system (MEMS) fabrication techniques, multichip packaging (MCMs), and integrated optical waveguide networks to integrate high-speed processing units and high-capacity transmission mediums at the module level.

It is another object of the present invention to provide micromachined active air/liquid cooling systems integrated at the module level by micropumps or micromotors and through-holes.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, improved MicroOptoElectroMechanical Systems (MOEMS) are provided to support the seamless integration of high performance computer systems and communication networks. Such MOEMS integrate high speed electronic processing units and high bandwidth photonic interconnection networks by combining into a single module: (1) active electronic/ photonic processing units, (2) passive electronic/photonic interconnection networks, and (3) micromachined silicon mirrors used as optical Input/Output (I/O) couplers.

Through the use of the MOEMS device structure, reliable, high speed, and low cost optoelectronic multichip modules (OE-MCMs) can be fabricated in a batch process using well-established integrated circuit (IC) fabrication processes. The OE-MCMs are hybrid multichip modules capable of supporting high performance computer systems and communication networks, and integrate active electronic/photonic processing units (such as microprocessors and laser diode or photo diode arrays), passive electronic/photonic interconnection networks (such as multilayer metal wires and integrated optical waveguide networks), and optical I/O couplers into a single MCM substrate. By using both sides of the silicon substrates multiple metal layers and multiple optical waveguide layers can be successfully manufactured for all types of metal and optical waveguide materials without any fabrication compatibility problems. MOEMS can accommodate the integrated optical waveguides fabricated through a low temperature process, such as a polyimide waveguide, as well as waveguides fabricated through a high temperature process, such as a silica glass waveguide. Furthermore, the integrated optical waveguide networks of multilayer structures can also be easily fabricated. Fabrication of any type of microstructures on micromachined silicon substrate for sensors, actuators, and other applications is easily accomplished using the present invention to create a smart microsystem.

The integrated I/O coupling method utilizes innovative combinations of through-holes across OE-MCM substrates and micromachined silicon mirrors constructed with Micro-ElectroMechanical System (MEMS) fabrication techniques. This arrangement provides the known benefits of MEMS technology such as miniaturization, multiplicity, and microelectronics, in addition to the seamless integration of photonic and electronic devices at the module level.

The micromachined silicon mirror I/O couplers with through-holes can be fabricated and assembled in a batch process to provide high reliability, uniform performance, and fabrication economy. Any numbers of I/O couplers can be fabricated in any locations on a substrate to accommodate various optical transmitter or receiver locations on MCMs. The integrated structure also eliminates individual I/O coupler assemblies and their associated alignment problems which have been recognized as one of the major obstacles for implementing optoelectronic interconnections. The I/O coupling efficiency typically will be uniform due to integrated device structures and the use of a one-step assembly process regardless of the number or location of I/O couplers.

Micromachined silicon mirrors can provide high reflectivity for infrared wavelengths, since photons with long wavelengths do not directly interact with silicon due to silicon's intrinsic bandgap. For shorter wavelengths (for example less than 900 nm), the micromachined silicon-mirrors can be coated with a polyimide or metal coating to improve the reflectivity of the silicon mirror, which can be otherwise degraded by the interaction of photons and silicon. Mosaic micromachined silicon mirrors also can be used as a basis to fabricate 45° mirrors pointing to any directions at any locations on the MOEMS.

Micromachined active cooling systems can be fabricated on MCMs when other types of microstructures such as micropumps and micromotors are fabricated along with silicon mirrors. The addition of an active cooling system is possible because MEMS fabrication techniques allow many different types of microstructures integrated on a single silicon substrate. Streams of cooling air/liquid can be delivered to the surfaces of active components on MCMs using through-holes and micropumps or micromotors.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 4 (comprising FIGS. 4A–4G) is a diagrammatic view of a multi-layer optoelectronic multichip module (OE-MCM) used in the MicroOptoElectroMechanical System assembly of FIG. 1, showing the OE-MCM at various stages of fabrication, in which the optical waveguides are constructed of a polyimide polymer and are contained in a single layer.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
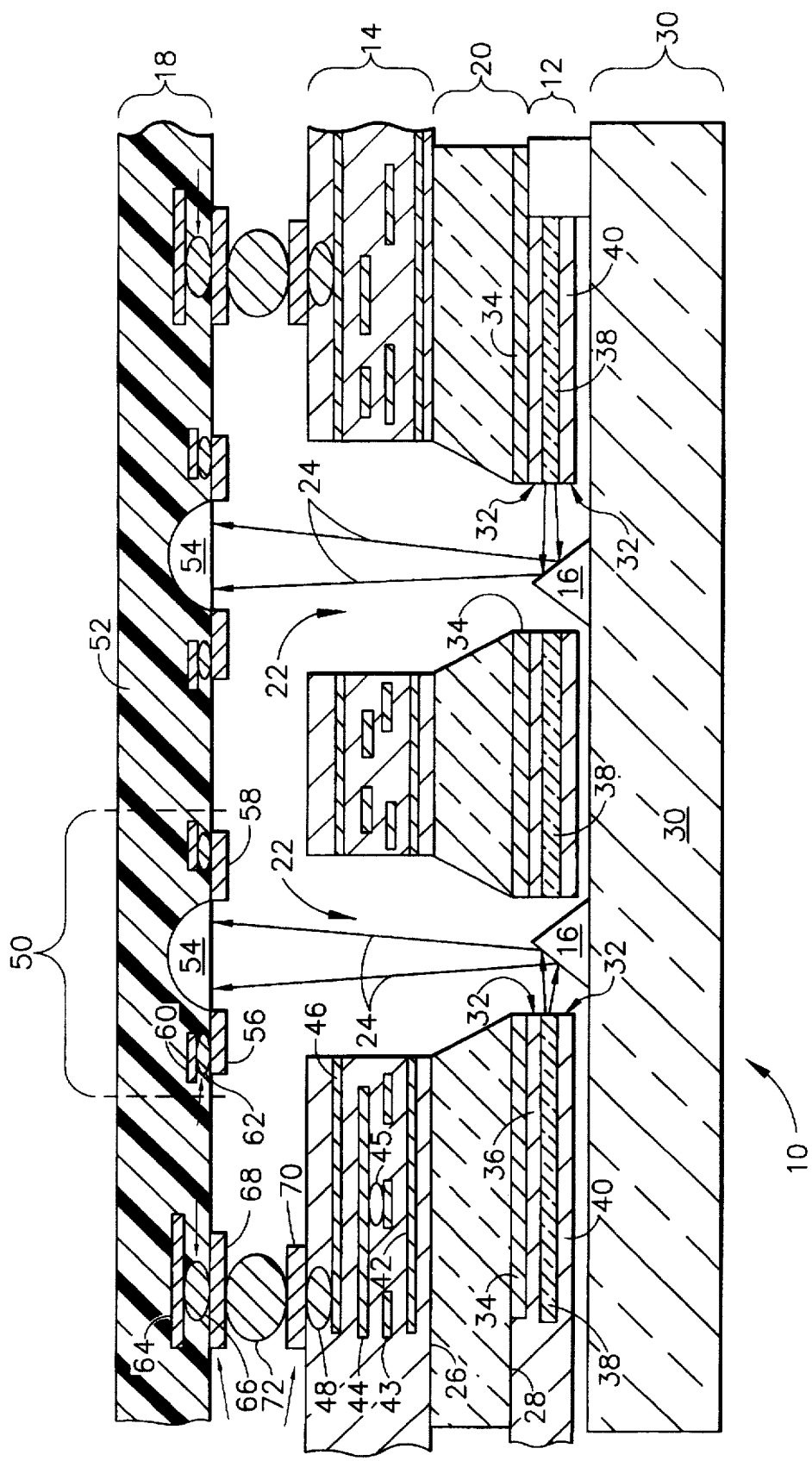
FIG. 1 is a cut-away elevational side view of a MicroOptoElectroMechanical System assembly, constructed according to the principles of the present invention.

Referring now to the drawings, FIG. 1 shows a MicroOptoElectroMechanical Systems (MOEMS) composed of electronic processing units, photonic/electronic interconnection networks, and micromachined I/O couplers on MCMs. The MOEMS exhibits an integrated MCM structure that can provide electrical metal layers for point-to-point interconnects, integrated optical waveguide layers for global signal distribution, micromachined silicon mirrors as I/O couplers, and several bare dies of integrated circuits (representing, e.g., commonly-available processors or photodiode arrays) bonded separately to the MCM.

MOEMS is essentially an integration of optoelectronic interconnection, MCM packaging, and MEMS fabrication technologies at the module level. The letters in the term "MOEMS" stand for "Micro" (micro-scale), "Optical" (integrated optical waveguide networks and active photonic devices like laser diodes and photodiodes), "Electronic" (integrated circuits and multilayer transmission lines on MCMs), "Mechanical" (silicon V-grooves and micromachined silicon mirrors, and micromachined sensors and actuators), and "Systems," and represent these components integrated into a single structure by using microfabrication technologies. Using the proposed MOEMS structure, optoelectronic multichip modules (OE-MCMs), capable of supporting high-performance computer systems and communication networks, can be fabricated in a batch process without any fabrication compatibility problems.

FIG. 1 shows the OE-MCM structure 10 that integrates an optical waveguide 12, multilayer electrical transmission lines 14, micromachined silicon mirrors 16, and C4-bonded (i.e., "flip-chip" bonded) photonic devices 18 into a single structure. Using both sides of the MCM substrate 20, multiple metal layers 14 and optical waveguide layers 12 can be successfully integrated for various types of metal or optical waveguide materials without any fabrication compatibility problems. The I/O coupling method utilizes a combination of through-holes 22 across the OE-MCM 10 and micromachined silicon mirrors 16 which are made using MEMS fabrication techniques. The I/O coupling method provides the known benefits of MEMS technology (such as miniaturization, multiplicity, and microelectronics), in addition to providing a seamless integration of photonic and electronic devices at the module level.

Miniaturization allows structures of a few tens of micrometers to be fabricated with an accuracy in the submicrometer range, while multiplicity allows many structures to be simultaneously fabricated by pre-assembly and batch processes. Micro-optoelectronics provides the fabrication and integration of optoelectronic circuits and sensors using conventional IC-compatible micromachining technology. The resulting integration provides smart micro systems having a variety of technologies (photonic, electronic and micromachining) at various levels of packaging (i.e., chip, module, and board levels). The invention fabricates OE-MCMs in a batch mode using a well-established IC fabrication process, thereby improving performance and reliability, and reducing costs.

The optical I/O coupler structure can be explained from the perspectives of microfabrication: the OE-MCM 10 is composed of three integrated components: (1) micromachined mirror substrate 30; (2) OE-MCM substrate 20 with multilayer metal wires 14 and integrated optical waveguides 12; and (3) active electronic or photonic devices that are flip-chip bonded to OE-MCMs (e.g., IC's or photodetector arrays), shown as an integrated circuit 18. These three components are separately fabricated, then assembled to construct the OE-MCM structure 10 using silicon wafer bonding and flip-chip bonding techniques.

In a multi-stackable OE-MCM constructed according to the principles of the present invention, a light beam (or laser beam) introduced into a waveguide on a substrate is required to be reflected to a vertical direction, thereby providing a very flexible optical communication between the multi-stacked OE-MCM boards. To reflect the light beam in the vertical direction with low optical aberration, a 45° micromirror is preferred (see FIG. 6). In the implementation of a multi-stackable OE-MCM it is preferred to construct the 45° micromirror with extremely smooth surfaces on a silicon wafer. It has been known that silicon {111} etched surfaces can be obtained from anisotropic etching on {100} silicon wafers, in which the {111} etched surfaces usually have an angle of 54.7° with respect to the {100} oriented surfaces (i.e., with respect to the vertical). The realization of a 45° micromirror on a silicon wafer has in the past been understood to be one of the most difficult tasks. It will be understood that the terms "{111}" and "{100}" refer to the silicon crystal orientations.

Electrical MCM's and optical waveguides are to be implemented on both sides of the silicon substrate 20, so that the electrical MCMs (e.g., substrate 20, metal layers 14, and IC 18), are positioned on the top side and the optical waveguides 12 are positioned on the bottom side (in FIG. 1, that is) which faces the 45° micromirrors 16. To allow an optical path 24 through the plane of the OE-MCM (e.g., substrate 20), micromachined holes 22 through the wafers preferably are etched, thus a light beam reflected from the mirrors 16 can reach the photodetector array 18 located on the top of the micromachined holes 22. In the preferred implementation of the electrical MCMs and the optical waveguides, silica glasses will be used as the waveguide material and silicon dioxide will be used as a dielectric insulator material for the electrical MCM 20, 14, and 18 (see FIGS. 2 and 3). For an example of an implementation of a hybrid MCM structure that contains both electrical and optical signals, see U.S. Pat. No. 5,416,861 (by Koh et al.), which fabricates the electrical paths and optical waveguides on the same side of a substrate, and uses discrete micromirrors or gratings to reflect optical signals vertically toward a separately-mounted photodetector integrated circuit. In Koh et al., the vertical optical signals do not travel via through-holes in the substrate, but instead travel through gaps in the electrical path metal layers.

The material processing steps and temperatures involved to construct the OE-MCM are greatly different as compared to conventional IC fabrication techniques, and new micromachining techniques are required to resolve the above incompatible fabrication processes. Silicon wafers can be safely manufactured using high temperature processing (e.g., above 800° C.) which is required during the deposition of the glass waveguide. It is preferred that a sequential process be used, such as deposition of the glass waveguide 12, anisotropic etching of the through-hole 22, then fabrication of the electrical MCM 20, 14, and 18 (see FIGS. 2 and 3).

As shown in FIG. 1, the OE-MCM structure of the present invention is composed of three integrated components: a photodetector array 18; an integrated electrical MCM and optical waveguide 12, 20, and 14; and a micromachined mirror 16. These three components preferably are separately fabricated, then assembled to construct the OE-MCM structure using flip-chip bonding techniques as well as silicon wafer bonding techniques. To improve optical interconnection as well as mechanical stability, an appropriate optical epoxy can be applied to fill the gap between the waveguide termination face 32 and mirror, and the optical through-holes 22.

Since OE-MCM structures usually require the transmission of an optical beam through the plane, the structure requires optical mirrors to reflect the optical signal from the termination face 32 of the optical waveguide 12 to the optical detector 50. This geometrical scheme is not easy to realize due to the vertical interconnections for both electrical and optical signal transmissions. Thus, major obstacles in making OE-MCM structures are overcome using the method of the present invention to combine the three integrated components, which are vertically assembled and interconnected in "batch" mode, thereby improving their performance and reducing fabrication costs. To date there has been great effort in the electronic field to overcome these obstacles, but no satisfactory conventional solution has yet resolved these problems.

On the bottom side 28 of the OE-MCM substrate 20, FIG. 1 shows as an illustrated example an optical waveguide 12 that comprises an oxidation layer 34, an upper buffer layer 34 made of a material having a relatively low index of refraction compared to the waveguide's core, a core layer 38, and (in this cross-section view of FIG. 1), the lower portion of the buffer layer, designated at the reference numeral 40.

On the upper side 26 of the OE-MCM substrate 20, the layers of material that carry the electrical signals are shown at reference numeral 14. In general, there are several layers or planes of metal circuit pathways, separated by a dielectric material such as silicon dioxide. In the illustrated example of FIG. 1, there is a ground plane 42, an X-signal plane 43 and a Y-signal plane 44, with interconnects at certain places such as at reference numeral 45, and a power supply plane 46, such as a Vdd plane. As seen in FIG. 1, a via 48 is used to make an electrical connection between the above bonding pad 70 and the underlying metal layers, such as layer 46.

In the detector integrated circuit 18, there are numerous photodetectors 50, wherein each of these comprise a depletion region 54 which is doped into the substrate 52, and photons will generate electron/hole pairs within these depletion regions 54. Depletion region 54 makes an electrical connection using metal circuit paths, such as reference numerals 56 and 58, to other internal metal pathways, such as a layer of paths at reference numeral 60, using a via 62. It will be understood that the metal layer 60 and via 62 are repeated many times throughout the integrated circuit 18, as necessary to create the proper circuit paths. To communicate the electrical signals from integrated circuit 18 to the metal layers 14 of the electrical MCM, the metal pathways such as paths 60 are ultimately communicated to other metal pathways such as pathway 64, as illustrated on FIG. 1. Metal pathway 64 is communicated using a via 66 to a bonding pad 68. A mating bonding pad 70 is located at the top of the via 48 on the metal layers 14. The bonding pads 68 and 70 are electrically connected together using a solder bump 72, fabricated by C4 bonding techniques.

To address the above problems in making OE-MCM structures, the present invention introduces micromachining techniques in fabricating as well as in assembling the desired integrated components. To detect the optical signals transmitted from the mirrors 16, the photodetectors 50 are fabricated on a compound semiconductor substrate 52 using conventional photodiode fabrication techniques, which can be then monolithically integrated to a separate silicon wafer (not shown) and flip-chip bonded to the remaining portions of the electrical MCM. For the fabrication of the integrated electrical MCM and optical waveguide components, a double-sided polished silicon wafer is used as the substrate 20 which ultimately holds the electrical MCM on its front side 26 and the optical waveguide on its rear side 28. The optical waveguide 12 can be constructed from either silica (see FIGS. 2 and 3) or polymer materials (see FIG. 4). One critical issue in fabricating the optical waveguide 20 is the construction of a straight side wall at the termination face 32 of the waveguide, to prevent light scattering in the optical interface (see FIGS. 2, 3, and 4), which can be addressed using RIE (reactive ion etching) techniques.

The fabrication steps of one version of the present invention are described in FIG. 2 (comprising FIGS. 2A to 2H). When using the silica waveguide, the waveguide is typically fabricated at the initial stage since the processing temperature is greater than 800° C., which is not compatible with the conventional electrical MCM process to follow. Hence, an anisotropic etching will be performed first through the silicon substrate, the fabrication of the electrical MCM will follow, then a directional RIE technique will be used to etch the holes through the electrical MCM and the optical waveguide, defining the side wall pattern. The starting material will be a double side polished silicon wafer 100, which is oxidized on both sides to create two (2) layers of silicon dioxide (in this illustration) 102 and 104. These oxidation layers are being prepared for later processing steps using photolithography.

Figure 2A:
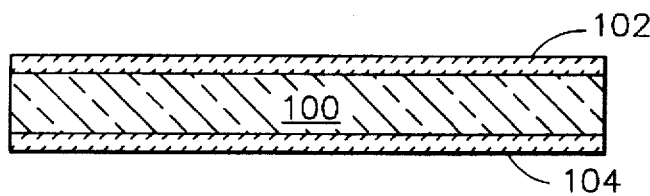
FIG. 2 (comprising FIGS. 2A–2H) is a diagrammatic view of a multi-layer optoelectronic multichip module (OE-MCM) used in the MicroOptoElectroMechanical System assembly of FIG. 1, showing the OE-MCM at various stages of fabrication, in which the optical waveguides are constructed of silica glass and are contained in a single layer.
Figure 2B:
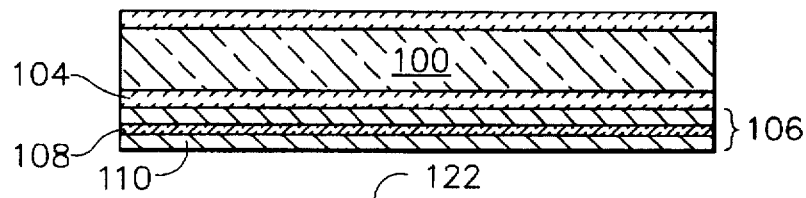

In FIG. 2B, an optical waveguide 106 is deposited on the oxide layer 104, and waveguide 106 includes an optical core 108, as well as the typical optical waveguide cladding layers 110.

Figure 2C:
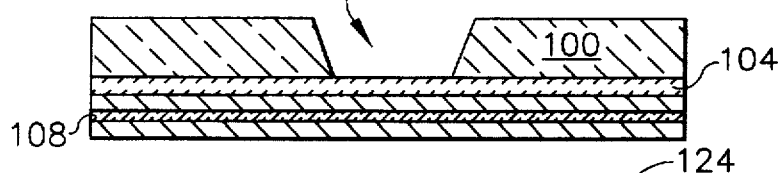

In FIG. 2C, the result of a bulk anisotropic etching step is shown creating a through-hole 122, and at the same time, the top oxide layer 102 is removed. It will be understood that, if desired, the top layer 102 can either be removed or not, depending upon the specific application for this structure.

Figure 2D:
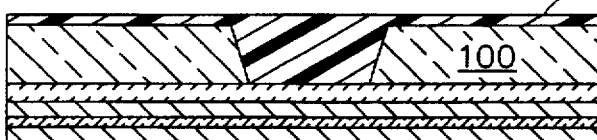

In FIG. 2D, the through-hole 122 is filled with a polyimide material to create a planarization layer, as shown as reference numeral 124, to be used for subsequent matter deposition.

Figure 2E:
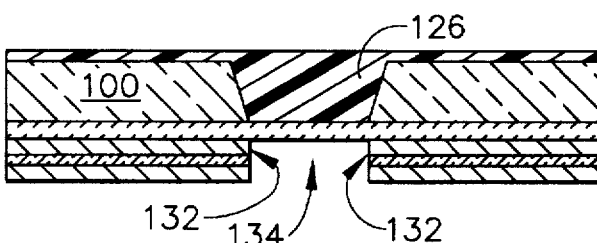

In FIG. 2E, straight side walls are created in the waveguide layer 106 to provide termination faces 132, which are required for the optical through-holes 122 being created, using RIE processes. As can be seen in FIG. 2E, the two (2) portions of the through-hole 122 are in alignment, these two (2) portions being the polyimide-filled hole portion 126, and the optical hole portion 134 formed between the two termination faces 132.

Figure 2F:
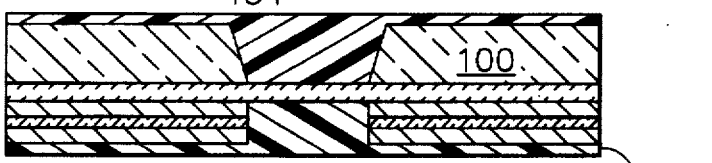

In FIG. 2F, polyimide material is provided to the bottom layer of the structure to create a planar protective bottom layer at reference numeral 136. This polyimide material also fills the optical-portion 134 of the through-hole 122, and specifically is used to protect the termination faces 132.

Figure 2G:
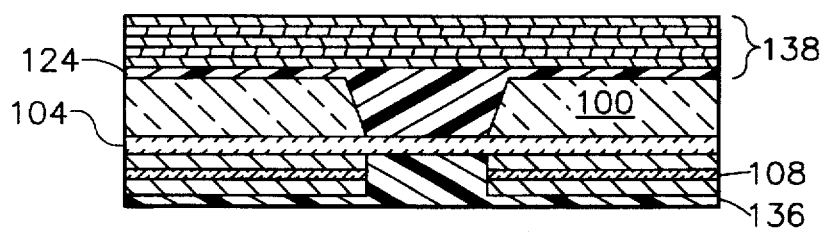

In FIG. 2G, the electrical MCM fabrications step occurs by adding multiple metal layers 138 to the upper portion of the structure on top of the polyimide layer 124.

Figure 2H:
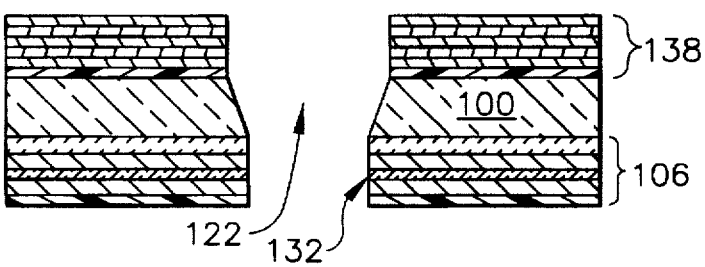
Figure 3A:
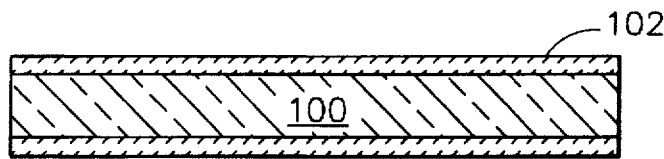
FIG. 3 (comprising FIGS. 3A–3H) is a diagrammatic view of a multi-layer optoelectronic multichip module (OE-MCM) used in the MicroOptoElectroMechanical System assembly of FIG. 1, showing the OE-MCM at various stages of fabrication, in which the optical waveguides are constructed of silica glass and are contained in multiple layers.
Figure 3B:
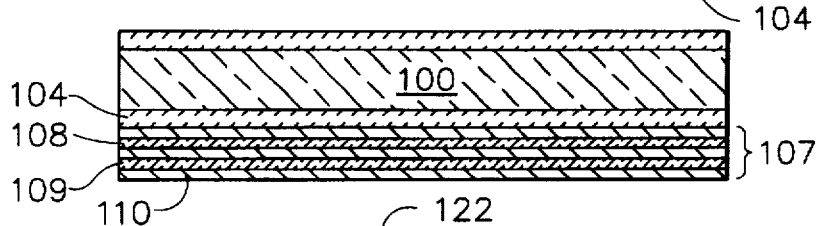
Figure 3C:
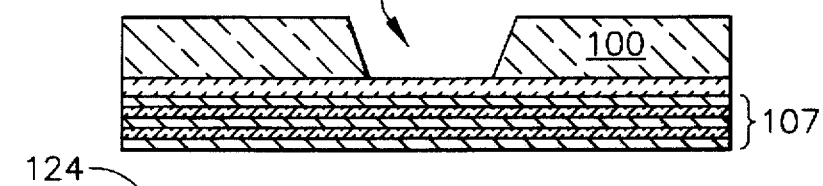
Figure 3D:
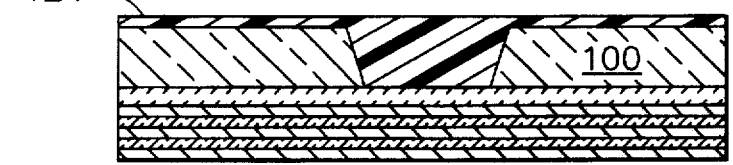
Figure 3E:
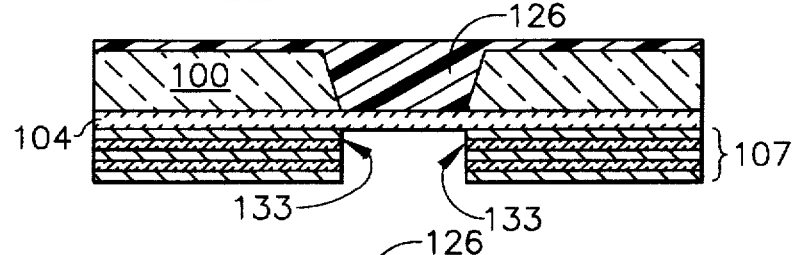
Figure 3F:
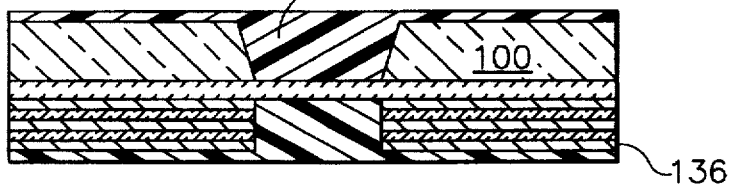
Figure 3G:
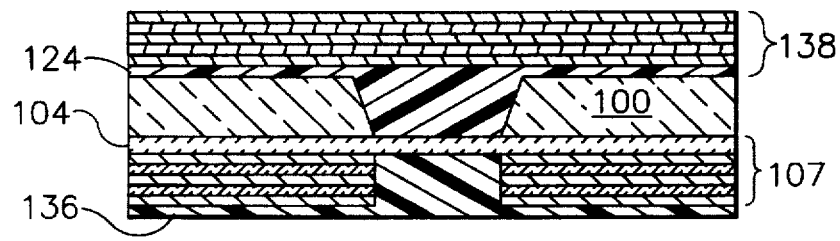
Figure 3H:
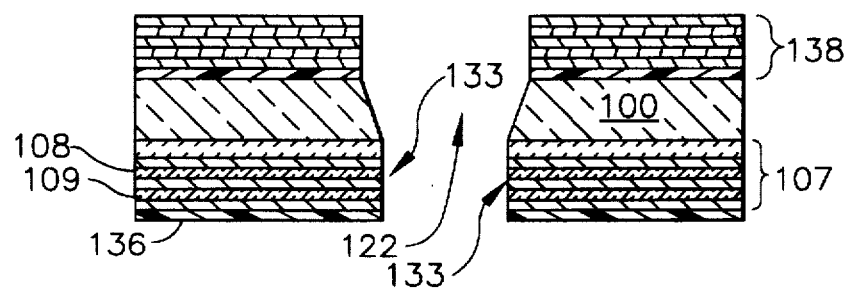

In FIG. 2H, the finished optical through-holes 122 are created by etching away the portions of polyimide material and the silicon dioxide that are temporarily in the location where the optical through-hole 122 is to be located. After this step has been performed, we now have a complete OE-MCM substrate with aligned through-holes, having at least one optical waveguide 106 and at least one metal layer 138 on opposite sides.

FIG. 3 comprises FIGS. 3A to 3H, and shows the process steps for creating an optical waveguide having multiple layers. The process steps shown in FIG. 3 are identical to those process steps shown in FIG. 2, except at the step of FIG. 3B, more than one waveguide layer is created, as illustrated by the two parallel optical core layers 108 and 109, within a single optical waveguide structure 107. As will be understood, there will be cladding layers, such as the bottom layer 110 of the optical waveguide 107, separating each of the core layers 108 and 109. It will also be understood that certainly more than two (2) layers of optical cores can be constructed using the techniques illustrated in FIG. 3B.

The remaining process steps in FIG. 3 are identical to the process steps in FIGS. 2C–2H, using the same materials to create similar structures. Of course, at FIG. 3E, straight vertical walls are created to act as termination faces 133 for more than one core layer of the optical waveguide 107. Additionally, it will be understood that all of the hole-portions both above and below the silicon dioxide layer 104 are placed into alignment to create a single aligned optical hole 122. The final result, of course, is an OE-MCM substrate with aligned through-holes having multiple optical waveguide layers on one side and multiple metal electrical pathways on its opposite side.

FIG. 4 comprises FIGS. 4A to 4G, and shows the process steps used in creating an OE-MCM substrate with metal electrical pathways on one side and optical waveguides on its other side, in which the optical waveguides are made of some type of polymer material. In this instance, the process steps in creating the optical waveguides are performed at relatively low temperatures. As can be seen in FIG. 4, the electrical metal layers are first constructed, and the optical waveguide is later constructed. This is made possible because the lower processing temperatures used during creation of the optical waveguides will not damage the metal layers previously constructed.

FIG. 4A shows the initial pure silicon substrate 100, and two (2) oxidation layers 102 and 104. In FIG. 4B, the upper portion of the optical through-hole 122 is created by bulk anisotropic etching. Also the top oxide layer 102 may be removed, if desired, although in this illustration it is retained.

In FIG. 4C, a polyimide fill step is performed, in which polyimide material is added to the through-hole region, and is also added as a planar top layer 124. In FIG. 4D, multiple metal layers for electrical pathways are added, as depicted by the reference numeral 138. This is termed as an electrical MCM fabrication step.

In FIG. 4E, a polyimide waveguide fabrication step is performed in which a waveguide 106 is created using a relatively low temperature polymer waveguide fabrication step. As can be seen in FIG. 4E, optical waveguide 106 comprises a core layer 108 along with associated cladding, including the bottom cladding layer 110.

In FIG. 4F, the straight vertical walls are etched in the waveguide 106, thereby creating termination faces 132 and leaving a hole-portion 134 which is in alignment with the upper hole-portion 126.

In FIG. 4G, the finished optical through-holes 122 are etched, thereby removing the polyimide material in the upper hole-portion 126. The optical through-hole 122 retains the straight walls that act as the termination faces 132.

Micromachined mirrors are also fabricated on a silicon substrate using the anisotropic bulk etching techniques (see FIGS. 5 and 6). In FIG. 5A, two (2) silicon wafers 200 and 202 are used, each of these wafers being double-sided polished. The upper wafer 200 will be the material used to create the micromachined silicon mirrors, and the bottom wafer 202 will be used as the substrate.

Figure 5A:
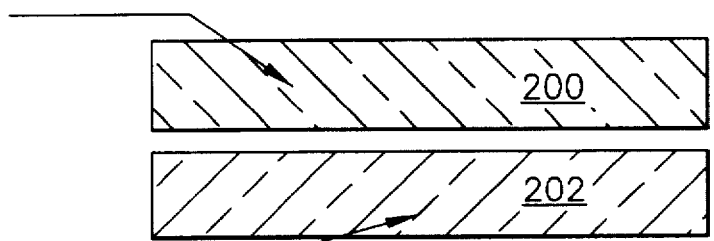
FIG. 5 (comprising FIGS. 5A–5F) is a diagrammatic view of a micromachined silicon substrate used in the MicroOptoElectroMechanical System assembly of FIG. 1, showing the substrate at various stages of fabrication, in which silicon mirrors are constructed.
Figure 5B:
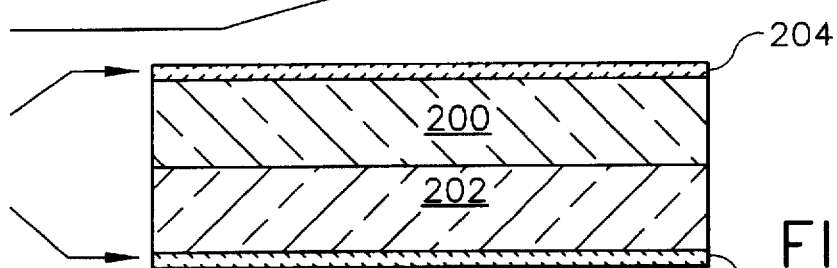

In FIG. 5B, both silicon wafers 200 and 202 are bonded together using a standard silicon wafer bonding technique (such as gold eutectic bonding or pyrex glass bonding). A top oxidation layer 204 of silicon dioxide is added to the upper surface of wafer 200, and a similar bottom oxidation layer 206 is added to the lower portion of wafer 202. The upper oxidation layer 204 will later be subjected to a photolithographic processing step in which certain areas of the material will be removed.

Figure 5C:
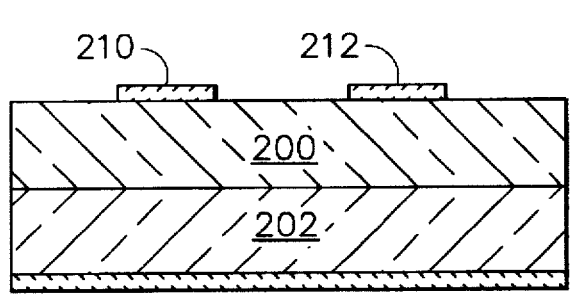

In FIG. 5C, a mirror patterning processing step will place the locations of the micromachined silicon mirrors, and as related above, portions of the oxidation layer 204 are removed by a photolithographic step. The two (2) remaining portions of the oxidation layer are designated at the reference numerals 210 and 212.

Figure 5D:
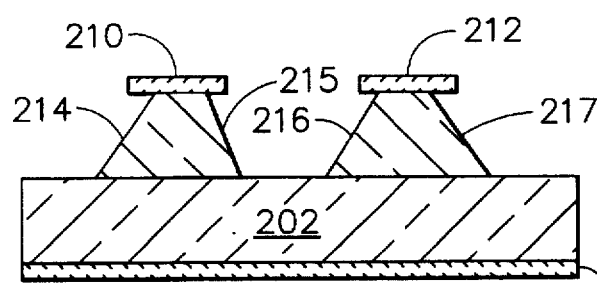

In FIG. 5D, a bulk anisotropic etching step is performed, in which a silicon mirror surface is created at each of the reference numerals 214, 215, 216, and 217. The angle of these mirror surfaces 214–217 is 54.7° with respect to the horizontal, which is a {100} plane of the silicon substrate material.

Figure 5E:
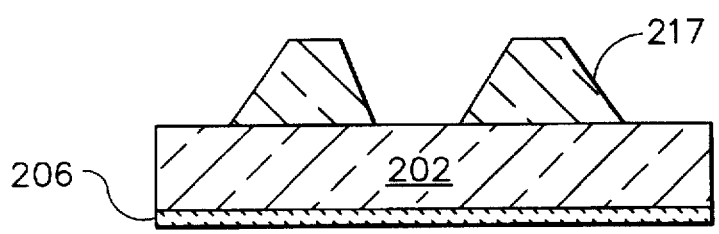

FIG. 5E shows the silicon mirror structure which remains behind after the upper oxidation layers 210 and 212 have been removed by the application of BHF solution. The final mirror surface is already created for long wavelengths of optical energy above 900 nm.

Figure 5F:
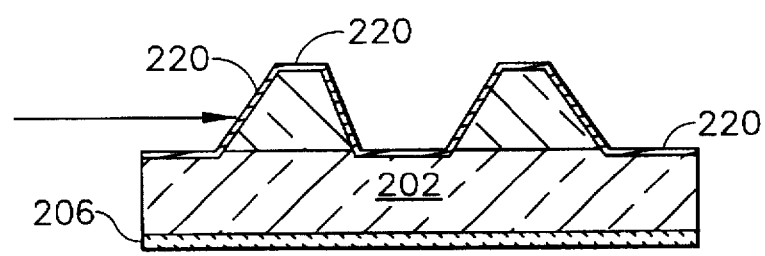

In FIG. 5F, an optional polyimide planarization coating and aluminum evaporation step is performed to coat the upper surface of the structure with an aluminum mirror coating layer 220. This aluminum layer improves the reflectability at short wavelengths, i.e., below 890 nm. During the fabrication of the mirrors, it is preferred that spacer fabrication be used to easily control the spacing between the OE-MCM substrate and the mirror substrate. To improve optical interconnection as well as mechanical stability, an appropriate optical epoxy is applied to fill the gap between the waveguide termination face and mirror, and the optical through-holes.

To reflect the light beam in the vertical direction with low optical aberration, a 45° micromirror is preferred (see FIG. 6).

One important fabrication process in the implementation of a multi-stackable OE-MCM is to construct on a silicon wafer a 45° micromirror having an extremely smooth surface. It has been known that the {111} etched surfaces can be obtained from anisotropic etching on {100} silicon wafers, in which the {111} etched surfaces usually have an angle of 54.7° with respect to {100} oriented surfaces. The realization of 45° micromirror on a silicon wafer has been understood as one of the most difficult tasks in the past. However, 45° micromirrors have been realized on silicon wafers using wet anisotropic etching techniques, as described below in greater detail.

In the present invention, a silicon wafer with a cut of 9.7° off the {100} surface has also been used, so 45° {111} flat planes as shown in FIG. 6 can be constructed. In FIG. 6, which comprises FIG. 6A to 6F, the processing steps to create 45° silicon mirrors are described. In FIG. 6A, three (3) double-polished silicon wafers 300, 302, and 304 are initially used in the processing to create mosaic silicon mirrors. As described herein, these mirrors can be fabricated at any X-Y coordinate on the surface of the bottom wafer 304. In FIG. 6, the upper-left wafer 300 will be constructed to create a 45° mirror to reflect optical energy that arrives from the left-hand side of the drawing as viewed in FIG. 6A. The upper-right wafer 302 will be used to create a 45° mirror to reflect optical energy that arrives from the right-hand side as viewed in FIG. 6A. Wafer 304 is used as a substrate.

Wafers 300 and 302 have each been cut using a lapping machine at an angle of 9.7° off the {100} surface of a silicon wafer. Wafer 300 has a cut in which the wafer is tilted downward to the right before the cut is made, and the wafer 302 is tilted downward to the left before the cut is made.

Figure 6A:
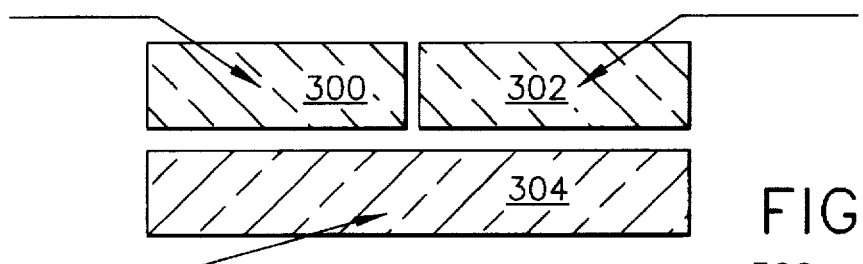
FIG. 6 (comprising FIGS. 6A–6F) is a diagrammatic view of a micromachined silicon substrate used in the MicroOptoElectroMechanical System assembly of FIG. 1, showing the substrate at various stages of fabrication, in which mosaic silicon mirrors having one side at a 45° angle are constructed.
Figure 6B:
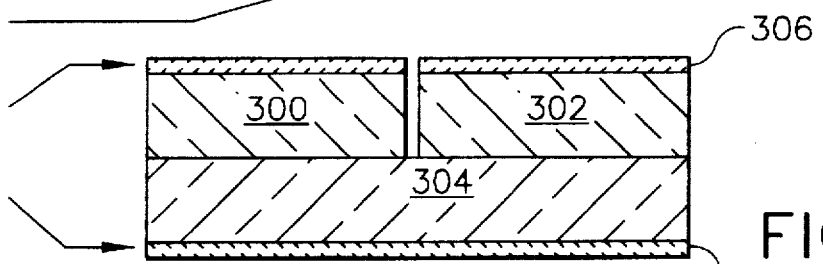
Figure 6C:
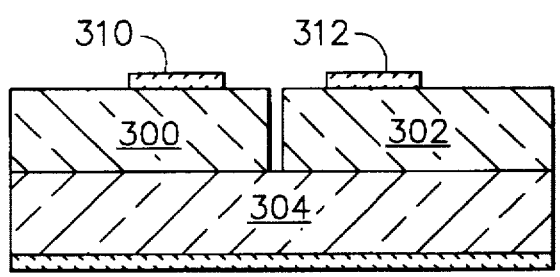
Figure 6D:
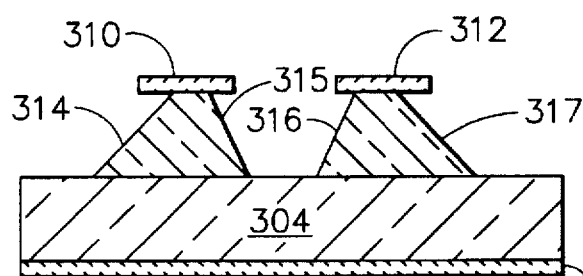

In FIG. 6B, both wafers 300 and 302 are wafer bonded to the substrate wafer 304, using the identical process steps as described for the structure shown in FIG. 5B. The remaining physical process steps that create the structure shown in FIGS. 6C–6F are identical to the process steps that were performed in FIGS. 5C–5F. In FIG. 6B, the oxidation layers are depicted by the reference numerals 306 and 308. In FIG. 6C, these oxidation layers are etched away except at the mirror locations, as per reference numerals 310 and 312.

Figure 6E:
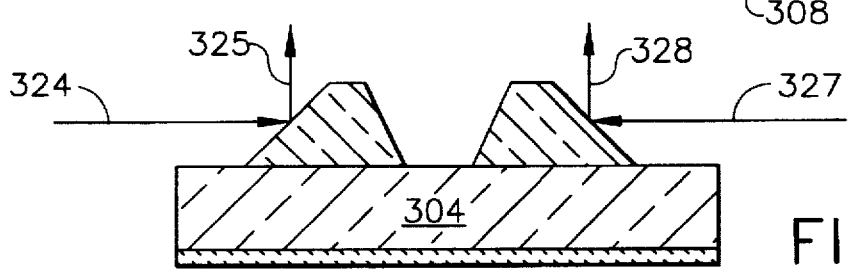
Figure 6F:
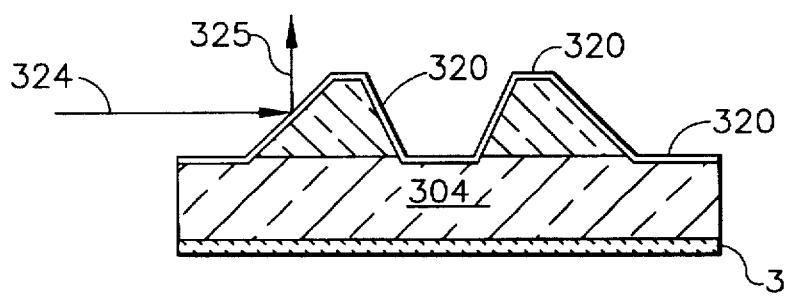

The silicon mirror surface 314 is oriented at a 45° angle with respect to the horizontal, and the silicon mirror surface 317 is also oriented at a 45° angle (on the opposite side of the vertical) from the horizontal (as compared to the 54.7° angle of surfaces 214 and 217). The angle with respect to the horizontal of faces 315 and 316 is now 64.8°. As seen in FIGS. 6E and 6F, the final silicon mirror surface can either have an aluminum deposition 320 or not, depending upon whether long wavelengths (over 900 nm) or short wavelengths (less than 890 nm) are used.

In FIG. 6E, optical energy arriving from the left, as shown by the arrow 324, will be reflected in a vertical direction, as seen by the arrow 325. Optical energy arriving from the right, at arrow 327, is also reflected vertically, at arrow 328.

Upon completion of the fabrication of the three separate OE-MCM components, they are stacked together using bonding techniques. First, the micromachined mirror substrate and the OE-MCM substrate are bonded together with 1.0 µm of deposited Pyrex glass. Then, an appropriate optical epoxy is injected to the gap between the waveguide tip and the mirror through the holes to improve optical transmission as well as mechanical stability. The epoxy is then cured, and the epoxy positioned at the top of the through-hole is polished to obtain a smooth end of the optical path through the hole. Finally, the fabricated OE-MCM structure is diced, and becomes ready for testing.

One of the existing challenges for high-speed MCM implementation is a module-level thermal management problem that arises from high power-consumption IC's packed into a small physical space. Passive cooling components like air-fins are commonly used for conventional thermal management systems. As more IC's with high power consumption are packed into a small MCM package, more efficient cooling systems are needed for reliable operations.

The present invention can improve the modules' thermal management capability using "active air/liquid cooling microsystems" embedded into a micromachined silicon substrate. Conventional MEMS fabrication techniques allow many different types of microstructures fabricated together such as silicon mirrors, V-grooves, micropumps, and micromotors. It is possible to remove the thermal energies generated by active components using flows of cooling air or liquid. Micropumps or micromotors on a micromachined silicon substrate can provide vertical streams of cooling air or liquid across through-holes.

Micropumps, micromotors, and through-holes can be fabricated in any number and in any position on MCMs by using the principles of the present invention. This feature permits an equalization of thermal distribution on MCMs as well as a high thermal removal rate. Thus "thermal local hot spots" on MCMs can be eliminated by micromachined active cooling systems. Micropumps powered by a 3 VDC power supply having a 5×5 mm footprint are currently available, having a 1000 µl per minute delivery capability, and with about one watt power consumption. Conventional high speed (e.g. 30,000 RPM) micromotors are readily available using MEMS fabrication techniques.

Figure 7:
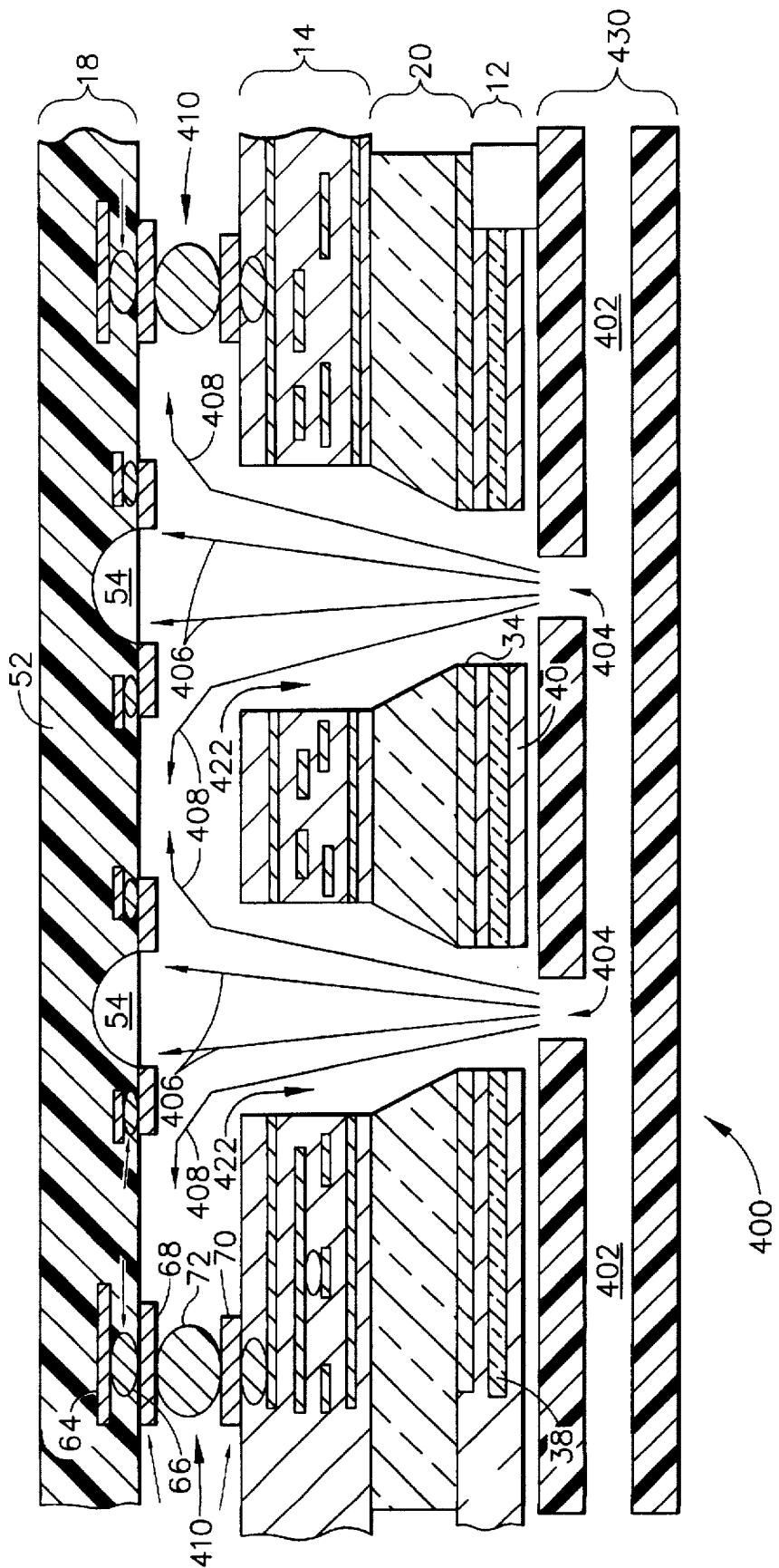
FIG. 7 is a cut-away elevational side view of a MicroOptoElectroMechanical System assembly, having a cooling system that circulates through various aligned through-holes, and constructed according to the principles of the present invention.

FIG. 7 is a cut-away elevational side view of an active air/liquid cooling microsystem, generally designated by the reference numeral 400, and constructed according to the principles of the present invention. The convective flows of chilled air/liquid can be generated and delivered to any local hot spot of the active IC's by micropumps, micromotors, or thermo-hydro-dynamic (THD) heat pumps. Coolant through-holes 422 and gaps 410 between active IC's (such as detector IC 18) and MCM's (such as metal layers 14, substrate 20, and optical waveguide 12) form natural microchannels. The current invention utilizes these microchannels 410 and 422 as a part of an active air/liquid cooling system by which steady flows of chilled electrically insulative gas or liquid can be delivered to any desirable locations and in any number.

On FIG. 7, a micromachined silicon substrate 430 containing micropumps (not shown) is depicted as being adjacent to an optical waveguide 12. Substrate 430 includes an embedded microchannel 402 that is connected to the micropumps. The locations designated by the reference numeral 404 represent micropump outlets, through which the cooling fluid (i.e., either a gaseous or liquid coolant) flow by convection into the MCM/detector IC structure. The coolant output follows the arrows 406 through aligned through-holes 422, which are fabricated as per the construction steps for through-holes 22 described hereinabove, and further follows the arrows 408 through the gap 410 between the MCM's metal layers 14 and the detector IC 18.

Such active cooling microsystems 400 can eliminate "thermal local hot spots" which can otherwise contribute to a system failure. Note that, due to the multiplicity nature of MEMS techniques, the locations and numbers of such microchannels and micropumps are not limited by any special geometric, optical, or electrical constraints. The convective heat transfer at the boundaries of active IC's, solder bumps (i.e., bump 72), and the upper surface of the MCM can substantially improve the thermal conductivity of the high density electronic/photonic modules, which solves a major known obstacle for the practical implementation of MCMs.

OE-MCMs demonstrate the feasibility of MOEMS which can integrate photonic, electronic, and mechanical components at a scale of micrometers. An example application of MOEMS is the creation of OE-MCMs which can relieve communication delays and connectivity problems of future generation high-performance computer systems and communication networks by integrating optoelectronic interconnection, MCM packaging, and MEMS fabrication technologies at the module level. Micromachined silicon mirrors are provided, which are capable of efficient, reliable, and economical operation as optical I/O couplers at any locations on the MCMs without any fabrication compatibility problems by using the existing IC fabrication processes. Practical OE-MCM implementation is realized by the use of the MOEMS of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An optoelectronic multichip module (OE-MCM) assembly, comprising:
   a substantially planar substrate having a first side and a second side, said first side having at least one integrated optical waveguide fabricated thereto, said second side having at least one integrated electrically conductive pathway fabricated thereto;
   said substrate, said at least one optical waveguide, and said at least one electrically conductive pathway each containing a plurality of through-holes that are located at pre-determined positions at any location upon said substrate, each of said through-holes being in alignment throughout its open area through each of said substrate, optical waveguide, and electrically conductive pathway; and
   said at least one optical waveguide and said at least one electrically conductive pathway being fabricated onto said substrate in a batch mode with no fabrication compatibility problems.

2. The OE-MCM as recited in claim 1, wherein said at least one integrated optical waveguide comprises a core and adjacent cladding, and said core comprises a glass material.

3. The OE-MCM as recited in claim 1, wherein said at least one integrated optical waveguide comprises a core and adjacent cladding, and said core comprises a polymer material.

4. The OE-MCM as recited in claim 1, wherein said at least one integrated electrically conductive pathway comprises a plurality of metal layers each separated by a dielectric insulative material.

5. The OE-MCM as recited in claim 1, further comprising a micromachined substrate having a plurality of micromachined mirrors fabricated on one of its substantially planar surfaces, said mirrors being located upon said micromachined substrate at positions that are in alignment with one of said through-holes, wherein each of said mirrors exhibits substantially uniform performance when compared to one another.

6. The OE-MCM as recited in claim 1, further comprising a silicon substrate having a plurality of 45° mosaic mirrors fabricated on one of its substantially planar surfaces, said mirrors being located upon said micromachined substrate at positions that are in alignment with one of said through-holes, wherein each of said mirrors exhibits substantially uniform performance when compared to one another.

7. The OE-MCM as recited in claim 5, further comprising an optical detector integrated circuit having a plurality of optical detectors, and that is mounted in a spaced-apart orientation to said OE-MCM such that each of said optical detectors is in a position to receive optical energy, after being reflected by one of said plurality of micromachined mirrors, that is output from a termination face of said at least one integrated optical waveguide.

8. The OE-MCM as recited in claim 6, further comprising an optical detector integrated circuit having a plurality of optical detectors, and that is mounted in a spaced-apart orientation to said OE-MCM such that each of said optical detectors is in a position to receive optical energy, after being reflected by one of said plurality of 45° mosaic mirrors, that is output from a termination face of said at least one integrated optical waveguide.

9. The OE-MCM as recited in claim 1, further comprising an active fluid cooling microsystem in which a fluid coolant is distributed throughout said OE-MCM through a plurality of microchannels, said microchannels comprising said plurality of through-holes and a gap between said OE-MCM and at least one spaced-apart active integrated circuits.

10. The OE-MCM as recited in claim 1, wherein one of said spaced-apart active integrated circuits comprises an optical detector integrated circuit.

11. The OE-MCM as recited in claim 9, further comprising at least one of a micropump, thermal pump, micromotor, and microfan used to provide motion to said coolant.

12. A method of fabricating an optoelectronic multichip module (OE-MCM) assembly in a batch mode while avoiding fabrication compatibility problems, said method comprising the steps of:
   (a) fabricating at least one integrated optical waveguide on one side of a substantially planar substrate of a wafer;
   (b) creating a first plurality of through-holes through said substrate located at pre-determined positions at any X-Y location upon said substrate;
   (c) creating a second plurality of through-holes through said at least one integrated optical waveguide, each of said second plurality of through-holes having a substantially straight side wall termination face, each of said second plurality of through-holes being in alignment with one of said first plurality of through-holes through said substrate;
   (d) fabricating at least one integrated electrically conductive pathway on the other side of said planar substrate; and
   (e) creating a third plurality of finished through-holes which are in alignment throughout their open areas through said substrate, said at least one integrated optical waveguide, and said at least one integrated electrically conductive pathway.

13. The method as recited in claim 12, wherein the step of fabricating said at least one integrated electrically conductive pathway occurs before the step of fabricating at least one integrated optical waveguide, and wherein said at least one integrated optical waveguide comprises at least one waveguide core made of a polymer material, and is deposited at a temperature less than the temperature during the fabrication of said at least one integrated electrically conductive pathway.

14. The method as recited in claim 12, wherein the step of fabricating said at least one integrated electrically conductive pathway occurs after the step of fabricating at least one integrated optical waveguide, and wherein said at least one integrated optical waveguide comprises at least one waveguide core made of a glass material, and is deposited at a temperature greater than the temperature during the fabrication of said at least one integrated electrically conductive pathway.

15. A method of fabricating a plurality of mosaic mirrors on a substrate in a batch mode while avoiding fabrication compatibility problems, said method comprising the steps of:
   (a) bonding a plurality of wafers onto a substantially planar substrate, wherein each of said plurality of wafers has been cut by a lapping machine at an angle off the surface of the wafer;
   (b) fabricating a pattern for mirror locations using oxidation and etching processes; and (c) creating a 45° mirror surface at each of said mirror locations by a bulk anisotropic etching process upon said plurality of wafers.

16. The method as recited in claim 15, further comprising the step of:
   (d) applying a reflective coating to the surface of each of said 45° mirrors using aluminum evaporation.

17. The method as recited in claim 15, wherein each of said plurality of wafers comprises a silicon wafer that has been cut by a lapping machine at an angle of substantially 9.7° off the {100} surface of the silicon wafer, and wherein each of the mirrors comprises a 45° silicon mirror.

* * * * *